United States Patent
Tanaka et al.

(10) Patent No.: US 7,654,935 B2
(45) Date of Patent: Feb. 2, 2010

(54) SHIFT CONTROL SYSTEM AND SHIFT CONTROL METHOD FOR CONTINUOUSLY VARIABLE TRANSMISSION

(75) Inventors: Naoto Tanaka, Okazaki (JP); Hiroji Taniguchi, Okazaki (JP); Shinya Toyoda, Nisshin (JP); Tadashi Tamura, Nishikamo-gun (JP); Akira Hino, Toyota (JP); Yasunari Matsui, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 381 days.

(21) Appl. No.: 11/808,552

(22) Filed: Jun. 11, 2007

(65) Prior Publication Data

US 2008/0009390 A1 Jan. 10, 2008

(30) Foreign Application Priority Data

Jul. 10, 2006 (JP) .............................. 2006-189720
Jul. 24, 2006 (JP) .............................. 2006-201217

(51) Int. Cl.
F16H 61/00 (2006.01)
(52) U.S. Cl. .............................. 477/45; 477/48; 477/50; 477/164
(58) Field of Classification Search .................. 477/45, 477/46, 48, 49, 50, 156, 164
See application file for complete search history.

(56) References Cited

U.S. PATENT DOCUMENTS 5,399,131 A * 3/1995 Kamada et al. ............. 477/150
6,123,645 A * 9/2000 Hopper ........................ 477/164
6,805,655 B2 * 10/2004 Hori et al. ................... 477/121
7,494,442 B2 * 2/2009 Futamura et al. ............ 477/158

FOREIGN PATENT DOCUMENTS

| JP | A 2003-227564 | 8/2003 |
|---|---|---|
| JP | A 2003-269588 | 9/2003 |
| JP | A 2003-343709 | 12/2003 |
| JP | A-2004-144233 | 5/2004 |
| JP | A-2004-316870 | 11/2004 |
| JP | A 2005-207569 | 8/2005 |
| JP | A-2005-299805 | 10/2005 |

OTHER PUBLICATIONS

T. Ide, "Experimental Investigation of Torque Transmission and Shift Speed Principle of Metal Belt CVT", Dec. 22, 2000.

* cited by examiner

Primary Examiner—Ha D. Ho
(74) Attorney, Agent, or Firm—Oliff & Berridge, PLC

(57) ABSTRACT

A maximum flow calculating unit calculates a maximum amount of hydraulic fluid that can flow into or out of an input-side hydraulic cylinder when a shift control command signal is set to a reference DUTY value, based on an estimated valve pressure difference calculated by an estimated pressure difference calculating unit, and a post-guard target sheave position setting unit performs a guard process for restricting the amount of change of the sheave position, using a guard value calculated by a guard value calculating unit based on the maximum flow amount, so as to set a post-guard target sheave position. Since the thus set target sheave position does not undergo excessive large changes nor excessively small changes during shifting, a target value for shifting is set so that a feedforward controlled variable determined based on the amount of change of the target sheave position becomes an appropriate value.

11 Claims, 8 Drawing Sheets

SHIFT CONTROL SYSTEM AND SHIFT CONTROL METHOD FOR CONTINUOUSLY VARIABLE TRANSMISSION

INCORPORATION BY REFERENCE

The disclosure of Japanese Patent Application No. 2006-201217 filed on Jul. 24, 2006 including the specification, drawings and abstract is incorporated herein by reference in its entirety.

BACKGROUND OF THE INVENTION

1. Field of the Invention

The invention relates to shift control system and shift control method for a continuously variable transmission, and, more particularly to techniques for setting a target value used for obtaining a command value generated when the continuously variable transmission is shifted up or down.

2. Description of the Related Art

In a shift control system for a continuously variable transmission having a hydraulic actuator that is driven with hydraulic fluid supplied thereto or discharged therefrom so as to continuously change the speed ratio, it is well known to effect shifting of the continuously variable transmission by driving a shift control valve that adjusts the amount of hydraulic fluid flowing into or out of the hydraulic actuator, in a controlled manner.

One example of the above type of control system for a continuously variable transmission is disclosed in JP-A-2003-343709. In shift control of a belt-and-pulley type continuously variable transmission having primary pulley and secondary pulley each having a variable effective diameter and including a fixed sheave and a movable sheave, as disclosed in this publication, a drive command value for use in drive control of the shift control valve is calculated based on a feedback command value determined based on a difference between a target input shaft rotational speed and an actual input shaft rotational speed, and a feedforward command value determined based on the rate of change of a target value associated with the movable sheave of the primary pulley.

If the target value is set to increase stepwise in order to improve the shift response when the feedforward command value is obtained based on the rate of change of the target value, as disclosed in the above-identified publication, the feedforward command value may become excessively large, namely, may go beyond an appropriate range in which the command value can be generated without problems, depending upon the rate of change of the target value.

In view of the above possibility, it may be proposed to restrict changes of the target value so as to prevent excessively large changes thereof. However, if changes of the target value are restricted too much to be excessively small, the shift response may undesirably become insufficient or unsatisfactory.

SUMMARY OF THE INVENTION

It is therefore an object of the invention to provide shift control system and shift control method for a continuously variable transmission, in which a target value used for shifting of the transmission is set so that a feedforward controlled variable becomes an appropriate value upon shifting of the continuously variable transmission.

A first aspect of the invention relates to a shift control system for a continuously variable transmission of a vehicle having a hydraulic actuator that is driven with a hydraulic fluid supplied thereto or discharged therefrom so as to continuously change a speed ratio of the transmission, in which a drive command value for use in drive control of a shift control valve that adjusts an amount of the hydraulic fluid flowing into or out of the hydraulic actuator is obtained based on a feedforward controlled variable that is determined based on an amount of change of a target value for use in shift control of the continuously variable transmission. The shift control system includes: an estimated pressure difference calculating unit that calculates an estimated value of a pressure difference between an upstream hydraulic pressure and a downstream hydraulic pressure of the shift control valve, a maximum flow calculating unit that calculates a maximum flow amount as the maximum amount of the hydraulic fluid that can flow into or out of the hydraulic actuator when the drive command value is set to a predetermined value, based on the estimated value of the pressure difference, a guard value calculating unit that calculates a guard value of an amount of change of the target value, based on the maximum flow amount, and a target value setting unit that performs a guard process for restricting the amount of change of the target value, using the guard value, so as to set the target value.

In the shift control system according to the first aspect of the invention, the maximum flow calculating unit calculates the maximum amount of hydraulic fluid that can flow into or out of the actuator when the drive command value is set to the predetermined value, based on the estimated value of the pressure difference between the upstream hydraulic pressure and downstream hydraulic pressure of the shift control valve, which is calculated by the estimated pressure difference calculating unit. Then, the guard value calculating unit calculates the guard value of the amount of change of the target value, based on the maximum flow amount, and the target value setting unit performs a guard process for restricting the amount of change of the target value, using the guard value, so as to set the target value. Accordingly, the target value does not undergo excessively large changes nor excessively small changes during shifting of the continuously variable transmission, and, therefore, the target value used for shifting is set so that the feedforward controlled variable determined based on the amount of change of the target value becomes an appropriate value.

In the first aspect of the invention, the maximum flow calculating unit may use a value that is smaller by a specified degree than the maximum value of the drive command value, as the predetermined value. In this case, where feedback control is performed, a sufficient amount of hydraulic fluid is supplied to the actuator according to the drive command value determined based on the feedback controlled variable, and, therefore, the control response associated with the feedback control is maintained at a sufficiently high speed.

In the first aspect of the invention, the estimated pressure difference calculating unit may set a computed value of the pressure difference determined based on the upstream hydraulic pressure and downstream hydraulic pressure of the shift control valve, as the estimated value of the pressure difference, when the computed value is equal to or larger than a predetermined lower-limit value, and may set the lower-limit value as the estimated value of the pressure difference when the computed value is smaller than the predetermined lower-limit value. In this case, even if the computed value of the pressure difference is erroneously estimated to be an extremely small value, which is smaller than the predetermined lower-limit value, the maximum flow amount calculated based on the estimated value of the pressure difference is prevented from becoming an excessively small value. Consequently, the guard value of the amount of change of the target value is prevented from being an excessively small value, and the target value does not undergo excessively small changes.

In the first aspect of the invention, the upstream hydraulic pressure of the shift control valve may be a line pressure, and the downstream hydraulic pressure of the shift control valve may be a hydraulic pressure applied to the hydraulic actuator. Also, the estimated pressure difference calculating unit may calculate an estimated value of the maximum pressure difference between the line pressure and the hydraulic pressure applied to the hydraulic actuator, based on the maximum line pressure that can be produced. In this case, the maximum amount of hydraulic fluid that can flow into or out of the hydraulic actuator is calculated, and the flow amount can be stably outputted.

In the first aspect of the invention, the continuously variable transmission may be a belt-and-pulley type continuously variable transmission having a primary pulley and a secondary pulley each having a variable effective diameter and including a fixed sheave and a movable sheave, and a belt that engages the primary and secondary pulleys. In this type of transmission, the hydraulic actuator may operate to drive the movable sheave of the primary pulley, and the position of the movable sheave may be set as the target value. In this manner, shifting of the belt-and-pulley type continuously variable transmission is appropriately carried out.

In the first aspect of the invention, the continuously variable transmission may be a toroidal type continuously variable transmission having a pair of coned members that are rotated about a common axis, and a plurality of rollers that are sandwiched between said pair of coned members and are rotatable about an axis of rotation that intersects with the common axis. In this type of transmission, an angle of intersection between the axis of rotation of the rollers and the axis of rotation of the coned members may be changed so as to continuously change a speed ratio of the continuously variable transmission.

In the first aspect of the invention, the maximum flow calculating unit may use a value that can be varied as shifting of the transmission proceeds, as the predetermined value.

A second aspect of the invention relates to a shift control method for a continuously variable transmission of a vehicle having a hydraulic actuator that is driven with a hydraulic fluid supplied thereto or discharged therefrom so as to continuously change a speed ratio of the transmission, wherein a drive command value for use in drive control of a shift control valve that adjusts an amount of the hydraulic fluid flowing into or out of the hydraulic actuator is obtained based on a feedforward controlled variable that is determined based on an amount of change of a target value for use in shift control of the continuously variable transmission. The shift control method includes the steps of: calculating an estimated value of a pressure difference between an upstream hydraulic pressure and a downstream hydraulic pressure of the shift control valve, calculating a maximum flow amount as the maximum amount of the hydraulic fluid that can flow into or out of the hydraulic actuator when the drive command value is set to a predetermined value, based on the estimated value of the pressure difference, calculating a guard value of an amount of change of the target value, based on the maximum flow amount, and performing a guard process for restricting the amount of change of the target value, using the guard value, so as to set the target value.

In the second aspect of the invention, a value that is smaller by a specified degree than the maximum value of the drive command value may be used as the predetermined value.

In the second aspect of the invention, a computed value of the pressure difference determined based on the upstream hydraulic pressure and downstream hydraulic pressure of the shift control valve may be set as the estimated value of the pressure difference when the computed value is equal to or larger than a predetermined lower-limit value, and the lower-limit value may be set as the estimated value of the pressure difference when the computed value is smaller than the predetermined lower-limit value.

In the second aspect of the invention, the upstream hydraulic pressure of the shift control valve may be a line pressure, and the downstream hydraulic pressure of the shift control valve may be a hydraulic pressure applied to the hydraulic actuator. Also, an estimated value of the maximum pressure difference between the line pressure and the hydraulic pressure applied to the hydraulic actuator may be calculated based on the maximum line pressure that can be produced.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

One embodiment of the invention will be described in detail with reference to the accompanying drawings.

Figure 1:
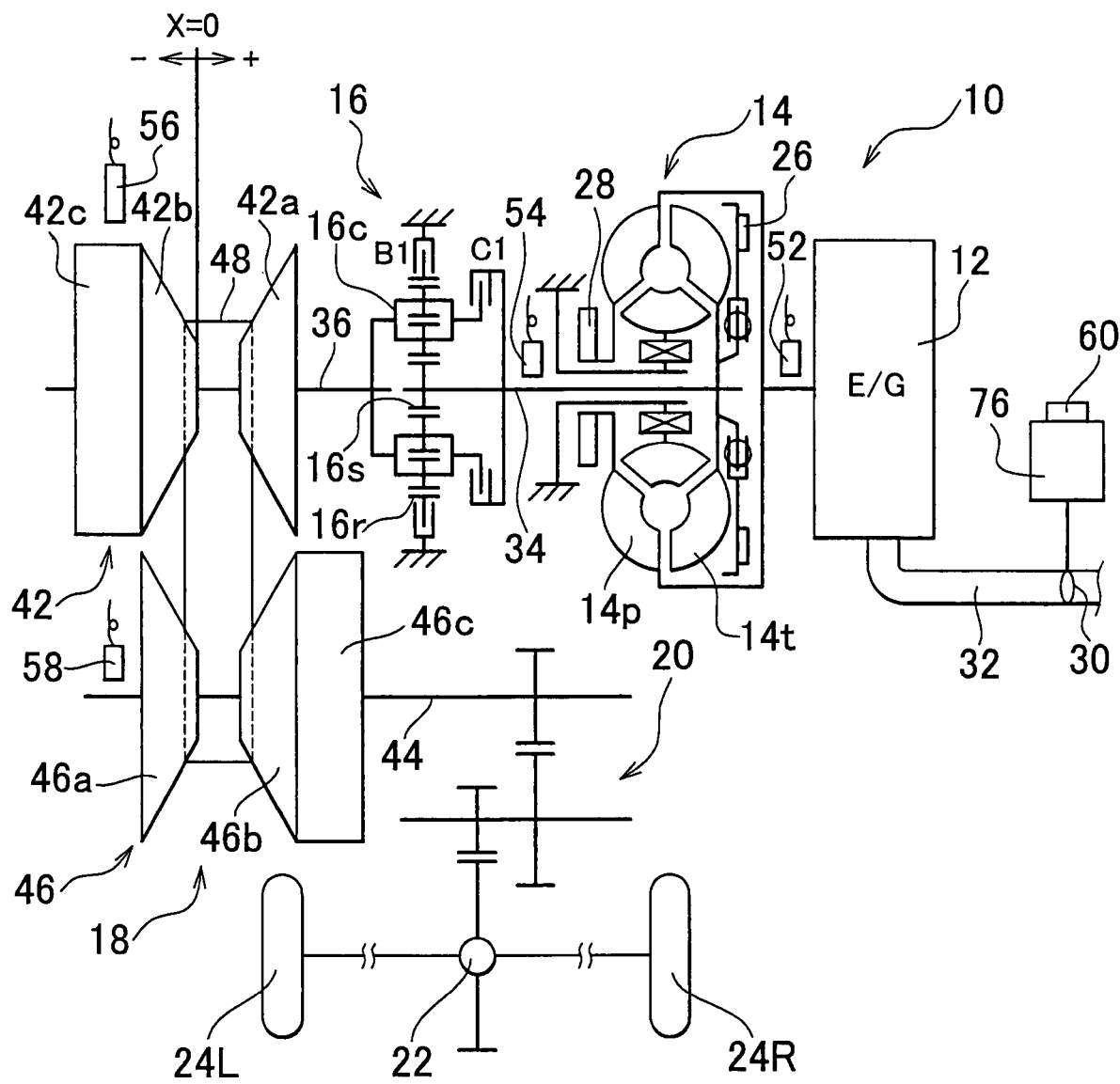
FIG. 1 is a skeleton diagram useful for explaining a vehicular drive system to which the invention is applied.

FIG. 1 schematically illustrates the construction of a vehicular drive system 10 to which the invention is applied. The vehicular drive system 10 is a transverse automatic transmission, which is favorably employed in a FF (front-engine, front-drive) vehicle, and includes an internal combustion engine 12 as a power source for running the vehicle. The output of the engine 12 is transmitted from a crankshaft of the engine 12 to a differential gear device 22, via a torque converter 14 as a hydraulic power transmitting device, a forward-reverse switching device 16, a belt-and-pulley type continuously variable transmission (CVT) 18, and a speed reduction gear device 20, and is then distributed to left and right drive wheels 24L, 24R.

Figure 2:
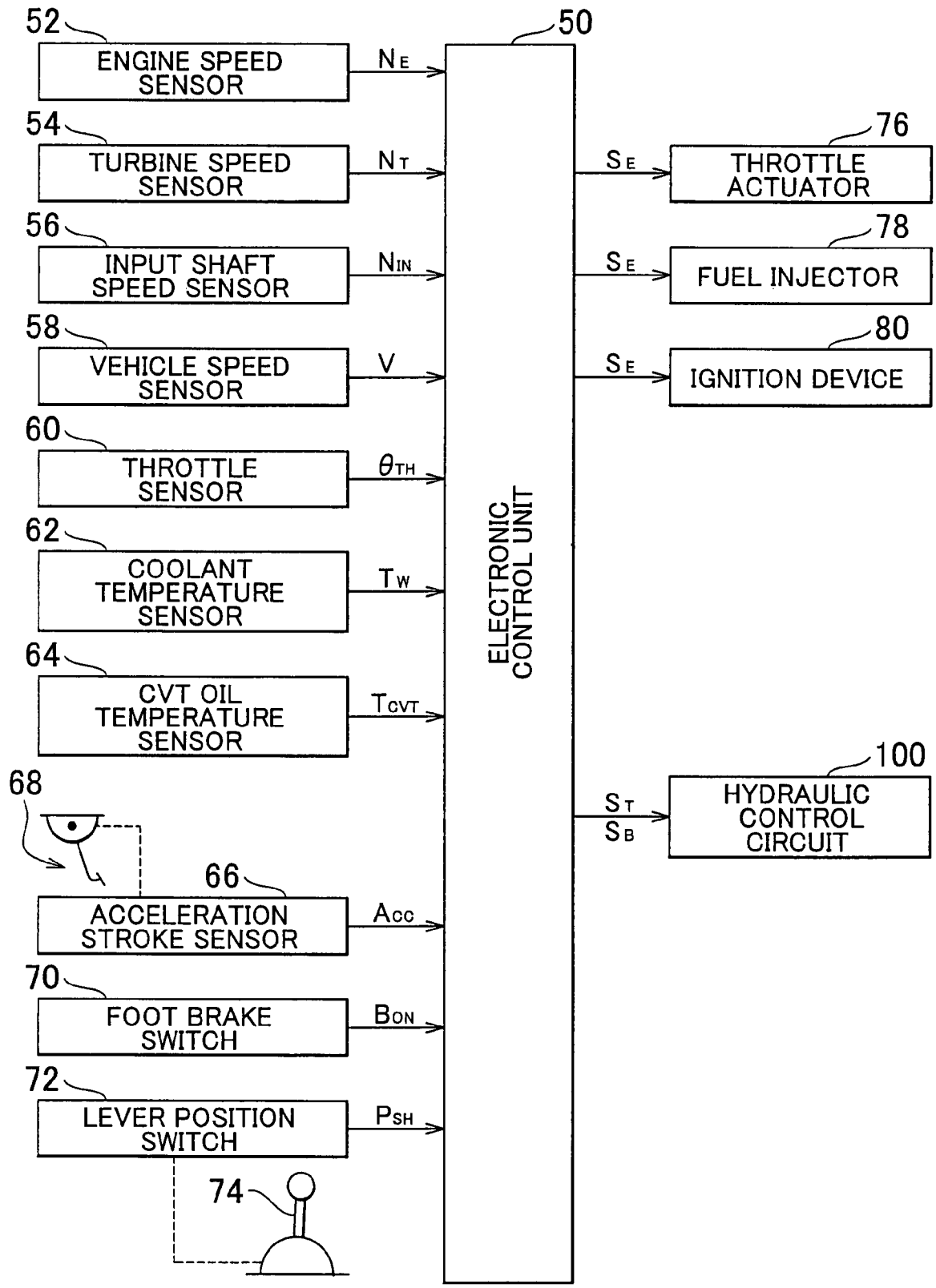
FIG. 2 is a block diagram useful for explaining a principal part of a control system provided in a vehicle for controlling the vehicular drive system of FIG. 1.
Figure 3:
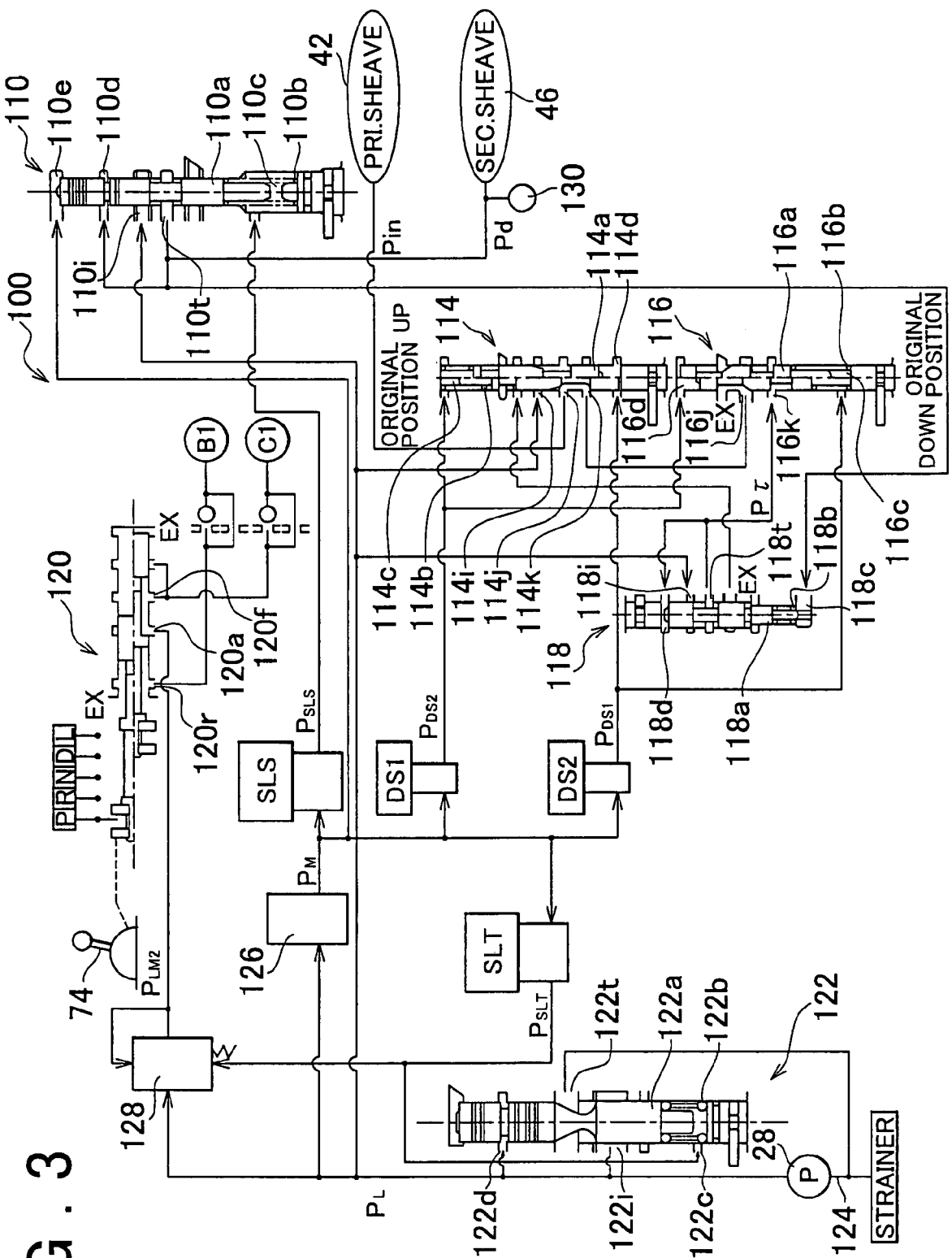
FIG. 3 is a hydraulic circuit diagram showing a principal part of a hydraulic control circuit associated with belt clamping force control and speed ratio control for a continuously variable transmission, and engaging pressure control for a forward-drive clutch and a reverse-drive brake selectively engaged or released according to the operation of the shift lever.

The torque converter 14 includes a pump impeller 14p connected to the crankshaft of the engine 12, and a turbine wheel 14t connected to the forward-reverse switching device 16 via a turbine shaft 34 serving as an output-side member of the torque converter 14, and is operable to transmit power by way of fluid. A lock-up clutch 26 is disposed between the pump impeller 14p and the turbine wheel 14t. To engage or release the lock-up clutch 26, a lock-up control valve (L/C control valve) (not shown) incorporated in a hydraulic control circuit 100 (as shown in FIG. 2 and FIG. 3) is operated so as to switch supply of hydraulic pressure to an oil chamber for engaging the clutch and an oil chamber for releasing the clutch. When the lock-up clutch 26 is fully engaged, the pump impeller 14p and the turbine wheel 14t are rotated as a unit. To the pump impeller 14p is connected a mechanical oil pump 28, which is rotated or driven by the engine 12 to produce hydraulic pressures for controlling shifting of the continuously variable transmission 18, producing belt clamping force, controlling engagement/release of the lock-up clutch 26, and supplying lubricating oil to various parts of the driven system 10.

The forward-reverse switching device 16 consists principally of a planetary gear device of a double-pinion type, in which a sun gear 16s is integrally coupled to the turbine shaft 34 of the torque converter 14, and a carrier 16c is integrally coupled to an input shaft 36 of the continuously variable transmission 18. The carrier 16c and the sun gear 16s are selectively connected to each other via a forward-drive clutch C1, and a ring gear 16r is selectively fixed to the housing via a reverse-drive brake B1. The forward-drive clutch C1 and the reverse-drive brake B1, which may be regarded as connecting/disconnecting devices, are hydraulic friction devices that are engaged utilizing friction by means of respective hydraulic cylinders.

In a condition where the forward-drive clutch C1 is placed in an engaged state and the reverse-drive brake B1 is placed in a released state, the forward-reverse switching device 16 is rotated as a unit so that the turbine shaft 34 is directly connected to the input shaft 36, and a forward power transmission path is established through which forward driving force is transmitted to the continuously variable transmission 18. When the reverse-drive brake B1 is engaged and the forward-drive clutch C1 is released, the input shaft 36 is rotated in a direction opposite to the direction of rotation of the turbine shaft 34, and the forward-reverse switching device 16 establishes a reverse power transmission path through which reverse driving force is transmitted to the continuously variable transmission 18. When the forward-drive clutch C1 and the reverse-drive brake B1 are both released, the forward-reverse switching device 16 is placed in a neutral state (power cut-off state) in which power transmission is cut off.

The continuously variable transmission 18 includes an input-side variable-diameter pulley (primary pulley) 42 as an input-side member mounted on the input shaft 36, an output-side variable-diameter pulley (secondary pulley) 46 as an output-side member mounted on an output shaft 44 of the transmission 18, and a transmission belt 48 that engages V-grooves defined in the variable-diameter pulleys 42, 46. Each of the variable-diameter pulleys 42, 46 has a variable effective diameter or radius at which the transmission belt 48 contacts with the pulleys 42, 46. The continuously variable transmission 18 operates to transmit power by way of frictional force produced between the variable-diameter pulleys 42, 46 and the transmission belt 48.

The variable-diameter pulleys 42, 46 include input-side fixed sheave 42a and output-side fixed sheave 46a as fixed rotary members fixed on the input shaft 36 and the output shaft 44, respectively, and input-side movable sheave 42b and output-side movable sheave 46b as movable rotary members that are axially movably mounted on the input shaft 36 and the output shaft 44, respectively, such that the movable sheaves 42b, 46b cannot rotate relative to the input and output shafts 36, 44 about the axes thereof. The variable-diameter pulleys 42, 46 further include input-side hydraulic cylinder (primary-pulley-side hydraulic cylinder) 42c and output-side hydraulic cylinder (secondary-pulley-side hydraulic cylinder) 46c serving as hydraulic actuators for applying thrust for changing the widths of the V-grooves formed between the fixed sheaves 42a, 46a and the movable sheaves 42b, 46b, respectively. With the continuously variable transmission 18 thus constructed, the amount of hydraulic fluid supplied to or discharged from the input-side hydraulic cylinder 42c is controlled by the hydraulic control circuit 100, so that the radii or diameters (effective diameters) of the variable-diameter pulleys 42, 46 at which the transmission belt 48 engages with the pulleys 42, 46 are changed as a result of changes in the widths of the V-grooves of the pulleys 42, 46, and the speed ratio γ (=input shaft speed $N_{IN}$/output shaft speed $N_{OUT}$) is continuously changed. Also, a hydraulic pressure (belt clamping pressure Pd) of the output-side hydraulic cylinder 46c is regulated or controlled by the hydraulic control circuit 100, so that belt clamping force is controlled so as not to cause slipping of the transmission belt 48. As a result of the control as described above, a hydraulic pressure (shift control pressure Pin) of the input-side hydraulic cylinder 42c is developed.

FIG. 2 is a block diagram useful for explaining a principal part of a control system provided in the vehicle for controlling the vehicular drive system 10 of FIG. 1 and others. An electronic control unit 50 includes a so-called microcomputer that incorporates, for example, CPU, RAM, ROM, input and output interfaces, and other components. The CPU processes signals in accordance with programs stored in advance in the ROM, while utilizing the temporary storage function of the RAM, so as to perform output control of the engine, shift control of the continuously variable transmission 18, control of the belt clamping force, control of the torque capacity of the lock-up clutch 26, and other control operations. The CPU may be divided, as needed, into two or more sub-units, including one used for engine control, and one used for hydraulic control of the continuously variable transmission 18 and the lock-up clutch 26.

The electronic control unit 50 receives various signals, including a signal indicative of the crankshaft rotational speed ///corresponding with the angle (position) $A_{CR}$ (°) of rotation of the crankshaft and the speed of revolution of the engine 12 (engine speed) $N_E$ detected by an engine speed sensor 52, a signal indicative of the rotational speed of the turbine shaft 34 (turbine speed) detected by a turbine speed sensor 54, a signal indicative of the rotational speed $N_{IN}$ of the input shaft 36 (input shaft speed) as the input rotation speed of the continuously variable transmission 18 detected by an input shaft speed sensor 56, and a vehicle speed signal indicative of the vehicle speed V corresponding with the rotational speed $N_{OUT}$ of the output shaft 44 (output shaft speed) as the output rotation speed of the continuously variable transmission 18 detected by a vehicle speed sensor (output shaft speed sensor) 58. The electronic control unit 50 also receives a throttle opening signal indicative of a throttle opening $\theta_{TH}$ of an electronic throttle valve 30 provided in an intake pipe 32 (shown in FIG. 1) of the engine 12, which is detected by a throttle sensor 60, a signal indicative of a coolant temperature $T_W$ of the engine 12 detected by a coolant temperature sensor 62, and a signal indicative of an oil temperature $T_{CVT}$ of a hydraulic circuit of the continuously variable transmission 18 and others, which is detected by a CVT oil temperature sensor 64. The electronic control unit 50 further receives an acceleration stroke signal indicative of the acceleration stroke Acc as an amount of operation of an accelerator pedal 68, which is detected by an acceleration stroke sensor 66, a brake operation signal indicative of the presence $B_{ON}$ of the operation of a foot brake as a service brake, which is detected by a foot brake switch 70, and a selected position signal indicative of the lever position (selected position) of the shift lever 74, which is detected by a lever position sensor 72.

Also, the electronic control unit 50 generates engine output control command signals SE for use in output control of the engine 12, including, for example, a throttle signal for driving a throttle actuator 76 that controls opening and closing of the electronic throttle valve 30, an injection signal for controlling the quantity of fuel injected from a fuel injector 78, and an ignition timing signal for controlling the ignition timing of the engine 12 by an ignition device 80. The electronic control unit 50 also generates a shift control command signal $S_T$ for changing the speed ratio γ of the continuously variable transmission 18, for example, command signals for driving a solenoid valve DS1 and a solenoid valve DS2 that control the amount of hydraulic fluid flowing into the input-side hydraulic cylinder 42c, a clamping force control command signal $S_B$ for adjusting the clamping force applied to the transmission belt 48, for example, a command signal for driving a linear solenoid valve SLS that regulates the belt clamping pressure Pd, and a line pressure control command signal $S_L$ for controlling a line pressure $P_L$, for example, a command signal for driving a linear solenoid valve SLT that regulates the line pressure $P_L$, and other signals, to the hydraulic control circuit 100.

The shift lever 74 is disposed close to, for example, the driver's seat, and is manually operated to a selected one of five lever positions "P", "R", "N", "D" and "L" (FIG. 3) that are arranged in this order.

The "P" position is a parking position for releasing or disconnecting the power transmission path of the vehicular drive system 10, namely, placing the drive system 10 in a neutral state in which power transmission is cut off. In the "P" position, rotation of the output shaft 44 is mechanically locked or inhibited by a mechanical parking mechanism. The "R" position is a reverse drive position for rotating the output shaft 44 in the reverse direction, and the "N" position is a neutral position for placing the vehicular drive system 10 in a neutral state in which power transmission is cut off. The "D" position is a forward drive position in which the continuously variable transmission 18 is automatically shifted (i.e., an automatic shift mode is established) within a permissible range under suitable automatic shift control, and the "L" position is an engine brake position in which a strong engine brake is applied. Thus, the "P" position and the "N" position are non-running positions selected when the driver does not intend to run the vehicle, and the "R", position, "D" position and the "L" position are running positions selected when the driver intends to run the vehicle.

FIG. 3 is a hydraulic circuit diagram illustrating a principal part of the hydraulic control circuit 100 associated with control of the belt clamping force and speed ratio of the continuously variable transmission 18, and control of engaging pressures of the forward-drive clutch C1 and reverse-drive brake B1 performed in accordance with the operation of the shift lever 74. In FIG. 3, the hydraulic control circuit 100 includes a clamping force control valve 110 that regulates the belt clamping pressure Pd as a hydraulic pressure applied to the output-side hydraulic cylinder 46c so as not to cause slipping of the transmission belt 48, and speed ratio control valve UP 114 and speed ratio control valve DN 116 as shift control valves that control the amount of hydraulic fluid supplied to the input-side hydraulic cylinder 42c so as to continuously change the speed ratio γ. The hydraulic control circuit 100 also includes a thrust ratio control valve 118 that establishes a predetermined relationship or proportion between the shift control pressure Pin and the belt clamping pressure Pd, a manual valve 120 with which oil channels are mechanically switched in accordance with the operation of the shift lever 74 so as to engage or release the forward-drive clutch C1 and the reverse-drive brake B1, and so forth.

By using a hydraulic pressure generated from (produced by) the mechanical oil pump 28 that is rotated/driven by the engine 12, as an original pressure, a relief-type primary regulator valve (line-pressure regulating valve) 122 regulates the line pressure $P_L$ to a level commensurate with the engine load, or the like, based on a control pressure $P_{SLT}$ as an output pressure of the linear solenoid valve SLT.

More specifically, the primary regulator valve 122 includes a spool valve body 122a axially movably provided for opening and closing an input port 122i so as to discharge the hydraulic pressure produced by the oil pump 28 to an intake oil channel 124 via an output port 122t, a spring 122b serving as a biasing means for biasing the spool valve body 122a in the valve closing direction, an oil chamber 122c that contains the spring 122b and receives the control pressure $P_{SLT}$ for applying thrust to the spool valve body 122a in the valve closing direction, and an oil chamber 122d that receives the hydraulic pressure produced by the oil pump 28 so as to apply thrust to the spool valve body 122a in the valve opening direction.

The primary regulator valve 122 constructed as described above is placed in a state of equilibrium when the following equation (1) is satisfied:

$$P_L \times b = P_{SLT} \times a + F_S \quad (1)$$

where $F_S$ is biasing force of the spring 122b, a is pressure-receiving area that receives the control pressure $P_{SLT}$ in the oil chamber 122c, and b is pressure-receiving area that receives the line pressure $P_L$ in the oil chamber 122d. Accordingly, the line pressure $P_L$, which is expressed by the following equation (2), is proportional to the control pressure $P_{SLT}$.

$$P_L = P_{SLT} \times (a/b) + F_S/b \quad (2)$$

Thus, the primary regulator valve 122 and the linear solenoid valve SLT function as a pressure regulating device for regulating the pressure of the hydraulic fluid delivered from the oil pump 28 to the line pressure $P_L$, based on a line pressure control command signal $S_{PL}$ as a hydraulic pressure command value.

A modulator pressure $P_M$ provides an original pressure of the control pressure $P_{SLT}$ and a control pressure $P_{SLS}$ as an output hydraulic pressure of the linear solenoid valve SLS, and also provides an original pressure of a control pressure $P_{DS1}$ as an output hydraulic pressure of the solenoid valve DS1 (whose duty cycle is controlled by the electronic control unit 50) and an original pressure of a control pressure $P_{DS2}$ as an output hydraulic pressure of the solenoid valve DS2 (whose duty cycle is controlled by the electronic control unit 50). A modulator valve 126 regulates the modulator pressure $P_M$ to a constant level, using the line pressure $P_L$ as an original pressure.

A line pressure modulator No. 2 valve 128 regulates an output hydraulic pressure $P_{LM2}$ based on the control pressure $P_{SLT}$, using the line pressure $P_L$ as an original pressure.

The output hydraulic pressure $P_{LM2}$ is supplied to an input port 120a of the above-mentioned manual valve 120. When the shift lever 74 is operated to the "D" position or "L" position, the oil channels of the manual valve 120 are switched so that the output hydraulic pressure $P_{LMS}$ is supplied as a forward-drive output pressure to the forward-drive clutch C1 via a forward-drive output port 120f, and the hydraulic fluid in the reverse-drive brake B1 is drained (or discharged) from a reverse-drive output port 120r to, for example, the atmospheric pressure, via a discharge port EX. As a result, the forward-drive clutch C1 is engaged, and the reverse-drive brake B1 is released.

When the shift lever 74 is operated to the "R" position, the oil channels of the manual valve 120 are switched so that the output hydraulic pressure $P_{LMS}$ is supplied as a reverse-drive output pressure to the reverse-drive brake B1 via the reverse-drive output port 120r, and the hydraulic fluid in the forward-drive clutch C1 is drained (discharged) from the forward-drive output port 120f to, for example, the atmospheric pressure, via the discharge port EX. As a result, the reverse-drive brake B1 is engaged, and the forward-drive clutch C1 is released.

When the shift lever 74 is operated to the "P" position or "N" position, the oil channels of the manual valve 120 are switched so that an oil channel from the input port 120a to the forward-drive output port 120f and an oil channel from the input port 120a to the reverse-drive output port 120r are both cut off or disconnected, and the hydraulic fluid in the forward-drive clutch C1 and the hydraulic fluid in the reverse-drive brake B1 are both drained from the manual valve 120. As a result, the forward-drive clutch C1 and the reverse-drive brake B1 are both released.

The speed ratio control valve UP 114 includes a spool valve body 114a that is axially movable between an upshift position in which the line pressure $P_L$ can be supplied from an input port 114i to the input-side variable-diameter pulley 42 via an input/output port 114j and an input/output port 114k is closed, and an original position in which the input-side variable-diameter pulley 42 communicates with the input/output port 114k via the input/output port 114j. The speed ratio control valve UP 114 also includes a spring 114b as a biasing means for biasing the spool valve body 114a toward the original position, an oil chamber 114c that contains the spring 114b and receives the control pressure $P_{DS2}$ for applying thrust to the spool valve body 114a so as to move the spool valve body 114a toward the original position, and an oil chamber 114d that receives the control pressure $P_{DS1}$ for applying thrust to the spool valve body 114a so as to move the spool valve body 114a toward the upshift position.

The speed ratio control valve DN 116 includes a spool valve body 116a that is axially movable between a downshift position in which an input/output port 116j communicates with a discharge port EX, and an original position in which the input/output port 116j communicates with an input/output port 116k. The speed ratio control valve DN 116 further includes a spring 116b as a biasing member for biasing the spool valve body 116a toward the original position, an oil chamber 116c that contains the spring 116b and receives the control pressure $P_{DS1}$ for applying thrust to the spool valve body 116a so as to move the spool valve body 116a toward the original position, and an oil chamber 116d that receives the control pressure $P_{DS2}$ for applying thrust to the spool valve body 116a so as to move the spool valve body 116a toward the downshift position.

With the speed ratio control valve UP 114 and the speed ratio control valve DN 116 constructed as described above, when the speed ratio control valve UP 114 is placed in the closed state in which the spool valve body 114a is held in the original position under the bias force of the spring 114b, as shown in the left half with respect to the centerline of the valve 114 in FIG. 3, the input/output port 114j communicates with the input/output port 114k, and the hydraulic fluid in the input-side variable-diameter pulley 42 (the input-side hydraulic cylinder 42c) is allowed to flow into the input/output port 116j. Also, when the speed ratio control valve DN 116 is placed in the closed state in which the spool valve body 116a is held in the original position under the bias force of the spring 116b, as shown in the right half with respect to the centerline of the valve 116 in FIG. 3, the input/output port 116j communicates with the input/output port 116k, and a thrust ratio control pressure Pτ is allowed to be applied from the thrust ratio control valve 118 to the input/output port 114k.

When the control oil pressure $P_{DS1}$ is supplied to the oil chamber 114d of the speed ratio control valve UP 114, the spool valve body 114a receives thrust commensurate with the control pressure $P_{DS1}$, and is thus moved to the upshift position against the bias force of the spring 114b, as shown in the right half with respect to the centerline of the valve 114 in FIG. 3. As a result, the line pressure $P_L$ is supplied from the input port 114i to the input-side hydraulic cylinder 42c via the input/output port 114j, at a flow rate commensurate with the control pressure $P_{DS1}$, while the input/output port 114k is shut off or closed, and the hydraulic oil is inhibited from flowing into the speed ratio control valve DN 116. In this manner, the amount of hydraulic fluid in the input-side hydraulic cylinder 42c is increased, and the sheave position X of the input-side movable sheave 42b is shifted toward the input-side fixed sheave 42a by the input-side hydraulic cylinder 42c. As a result, the width of the V-groove of the input-side variable-diameter pulley 42 is reduced, and the speed ratio γ is reduced, namely, the continuously variable transmission 18 is shifted up. While the width of the V-groove of the output-side variable-diameter pulley 46 is increased at this time, the belt clamping force control valve 110 operates to regulate the belt clamping pressure Pd of the output-side hydraulic cylinder 46c so as not to cause slipping of the transmission belt 48, in a manner as described later.

When the control pressure $P_{DS2}$ is supplied to the oil chamber 116d of the speed ratio control valve DN 116, the spool valve body 116a receives thrust commensurate with the control pressure $P_{DS2}$, and is thus moved to the downshift position against the bias force of the spring 116b, as shown in the left half with respect to the centerline of the valve 116 in FIG.

3. As a result, the hydraulic fluid in the input-side hydraulic cylinder 42c is discharged from the input/output port 114j to the discharge port EX via the input/output port 114k and the input/output port 116j, at a flow rate commensurate with the control pressure $P_{DS2}$. In this manner, the amount of the fluid in the input-side hydraulic cylinder 42c is reduced, and the sheave position X of the input-side movable sheave 42b is shifted in a direction opposite to the input-side fixed sheave 42a (namely, the input-side movable sheave 42b is moved away from the input-side fixed-sheave 42a) by the input-side hydraulic cylinder 42c. As a result, the width of the V-groove of the input-side variable-diameter pulley 42 is increased, and the speed ratio γ is increased, namely, the continuously variable transmission 18 is shifted down. While the width of the V-groove of the output-side variable-diameter pulley 46 is reduced at this time, the clamping force control valve 110 operates to regulate the belt clamping pressure Pd of the output-side hydraulic cylinder 46c so as not to cause slipping of the transmission belt 48, in a manner as described later.

As is understood from the above description, the line pressure $P_L$ serves as the original pressure of the shift control pressure $P_{in}$. If the control pressure $P_{DS1}$ is generated, the line pressure $P_L$ received by the speed ratio control valve UP 114 is supplied to the input-side hydraulic cylinder 42c so as to raise the shift control pressure Pin for continuous upshifting of the continuously variable transmission 18. If the control pressure $P_{DS2}$ is generated, the hydraulic fluid in the input-side hydraulic cylinder 42c is discharged through the discharge port EX so that the shift control pressure Pin is reduced-for continuous downshifting of the transmission 18.

The position of the input-side movable sheave 42b at the time when the speed ratio γ is equal to 1 is regarded as a reference position. The sheave position X represents an absolute position of the input-side movable sheave 42b as measured from the reference position in a direction parallel to the axis of the sheave 42b. Thus, the sheave position X is equal to zero when the input-side movable sheave 42b is placed at the reference position. For example, X takes a positive value (+) on one of the opposite sides of the reference position closer to the input-side fixed sheave 42, and takes a negative value (−) on the other side of the reference position.

The control pressure $P_{DS1}$ is also supplied to the oil chamber 116c of the speed ratio control valve DN 116, so as to place the speed ratio control valve DN 116 in the closed state irrespective of the presence of the control pressure $P_{DS2}$ and thus restrict downshifting. On the other hand, the control pressure $P_{DS2}$ is supplied to the oil pressure 114c of the speed ratio control valve UP 114, so as to place the speed ratio control valve UP 114 in the closed state irrespective of the presence of the control pressure $P_{DS1}$ and thus inhibit upshifting. Namely, when both of the control pressure $P_{DS1}$ and the control pressure $P_{DS2}$ are supplied, as well as when both of the control pressure $P_{DS1}$ and the control pressure $P_{DS2}$ are not supplied, the speed ratio control valve UP 114 and the speed ratio control valve DN 116 are both held in the original positions, namely, in the closed states. With this arrangement, even in the case where one of the solenoid valves DS1, DS2 fails to perform its intended function due to a failure of an electric system, or the like, and the control pressure $P_{DS1}$ or the control pressure $P_{DS2}$ is kept generated at the maximum level, the continuously variable transmission 18 is prevented from rapidly shifted up or shifted down, and slipping of the transmission belt 48 due to such rapid shifting is prevented.

The belt clamping force control valve 110 includes a spool valve body 110a that is axially movably provided for opening and closing an input port 110i that receives the line pressure $P_L$ so that the belt clamping pressure Pd can be supplied from the input port 110i to the output-side variable-diameter pulley 46 and the thrust ratio control valve 118 via an output port 110t. The belt clamping force control valve 110 further includes a spring 110b serving as a biasing member for biasing the spool valve body 110a in the valve opening direction, an oil chamber 110c that contains the spring 110b and receives the control pressure $P_{SLS}$ so as to apply thrust to the spool valve body 110a in the valve opening direction, a feedback oil chamber 110d that receives the belt clamping pressure Pd generated from the output port 110t so as to apply thrust to the spool valve body 110a in the valve closing direction, and an oil chamber 110e that receives the modulator pressure $P_M$ so as to apply thrust to the spool valve body 110a in the valve closing direction.

The belt clamping force control valve 110 constructed as described above continuously regulates or controls the line pressure $P_L$, using the control pressure $P_{SLS}$ as a pilot pressure so as not to cause slipping of the transmission belt 48, thereby to generate the belt clamping pressure Pd from the output port 110t. Thus, the line pressure $P_L$ serves as the original pressure of the belt clamping pressure Pd. A hydraulic pressure sensor 130 for detecting the belt clamping pressure Pd is provided in an oil channel between the output port 110t and the output-side hydraulic cylinder 46c.

The thrust ratio control valve 118 includes a spool valve body 118a that is axially movably provided for opening and closing an input port 118i that receives the line pressure $P_L$, so that the thrust ratio control pressure Pτ can be supplied from the input port 118i to the speed ratio control valve DN 116 via an output port 118t. The thrust ratio control valve 118 further includes a spring 118b serving as a biasing member for biasing the spool valve body 118a in the valve opening direction, an oil chamber 118c that receives the belt clamping pressure Pd so as to apply thrust to the spool valve body 118a in the valve opening direction, and a feedback oil chamber 118d that receives the thrust ratio control pressure Pτ generated from the output port 118t so as to apply thrust to the spool valve body 118a in the valve closing direction.

The thrust ratio control valve 118 constructed as described above is placed in a state of equilibrium when the following equation (3) is satisfied:

$$P\tau \times b = Pd \times a + F_S \qquad (3)$$

where a is pressure-receiving area that receives the belt clamping pressure Pd in the oil chamber 118c, b is pressure-receiving area that receives the thrust ratio control pressure Pτ in the feedback oil chamber 118d, and $F_S$ is bias force of the spring 118b. Accordingly, the thrust ratio control pressure Pτ, which is expressed by the following equation (4), is proportional to the belt clamping pressure Pd.

$$P\tau = Pd \times (a/b) \times F_S/b \qquad (4)$$

When both of the speed ratio control valve UP 114 and the speed ratio control valve DN 116 are held in the original positions, namely, in the closed state, such as when both of the control pressure $P_{DS1}$ and the control pressure $P_{DS2}$ are not supplied, or when the control pressure $P_{DS1}$ of a certain level or higher and the control pressure $P_{DS2}$ of a certain level or higher are both supplied, the thrust ratio control pressure Pτ is supplied to the input-side hydraulic cylinder 42c, so that the shift control pressure Pin is made equal to the thrust ratio control pressure Pτ. Namely, the thrust ratio control valve 118 generates the thrust ratio control pressure Pτ, that is, the shift control pressure Pin, which holds a predetermined relationship or proportion between the shift control pressure Pin and the belt clamping pressure Pd.

In a low vehicle-speed condition in which the vehicle speed is equal to or lower than a specified vehicle speed V', for example, the input shaft speed sensor 56 and the vehicle speed sensor 58 detect the input shaft speed $N_{IN}$ and the vehicle speed V with relatively low accuracy. During low-vehicle-speed running or starting, therefore, so-called closing control is performed under which neither the control pressure $P_{DS1}$ nor the control pressure $P_{DS2}$ is supplied, and the speed ratio control valve UP 114 and the speed ratio control valve DN 116 are both placed in the closed state. With this control, during low-vehicle-speed running or starting, the shift control pressure Pin proportional to the belt clamping pressure Pd is supplied to the input-side hydraulic cylinder 42c so as to establish a predetermined relationship or proportion between the shift control pressure Pin and the belt clamping pressure Pd, whereby slipping of the transmission belt 48 is prevented from the time when the vehicle is at rest to the time when the vehicle runs at an extremely low speed. If (a/b) in the first term of the right side of the above equation (4) and $F_S/b$ in the second term are set so as to achieve a thrust ratio τ (=thrust $W_{OUT}$ produced by the output-side hydraulic cylinder/thrust $W_{IN}$ produced by the input-side hydraulic cylinder; $W_{OUT}$=belt clamping pressure Pd x pressure-receiving area $S_{OUT}$ of the output-side hydraulic cylinder 46c, and $W_{IN}$=shift control pressure Pin x pressure-receiving area $S_{IN}$ of the input-side hydraulic cylinder 42c) that is larger than the thrust ratio τ corresponding with the maximum speed ratio γmax, for example, the vehicle can be favorably started at the maximum speed ratio γmax or a speed ratio γmax' in the neighborhood of the maximum speed ratio γmax. The specified vehicle speed V' is a predetermined lower-limit vehicle speed V at which it becomes impossible to detect the rotational speed of a certain rotary member, for example, the input shaft speed $N_{IN}$. For example, the vehicle speed V' is set to about 2 km/h.

Figure 4:
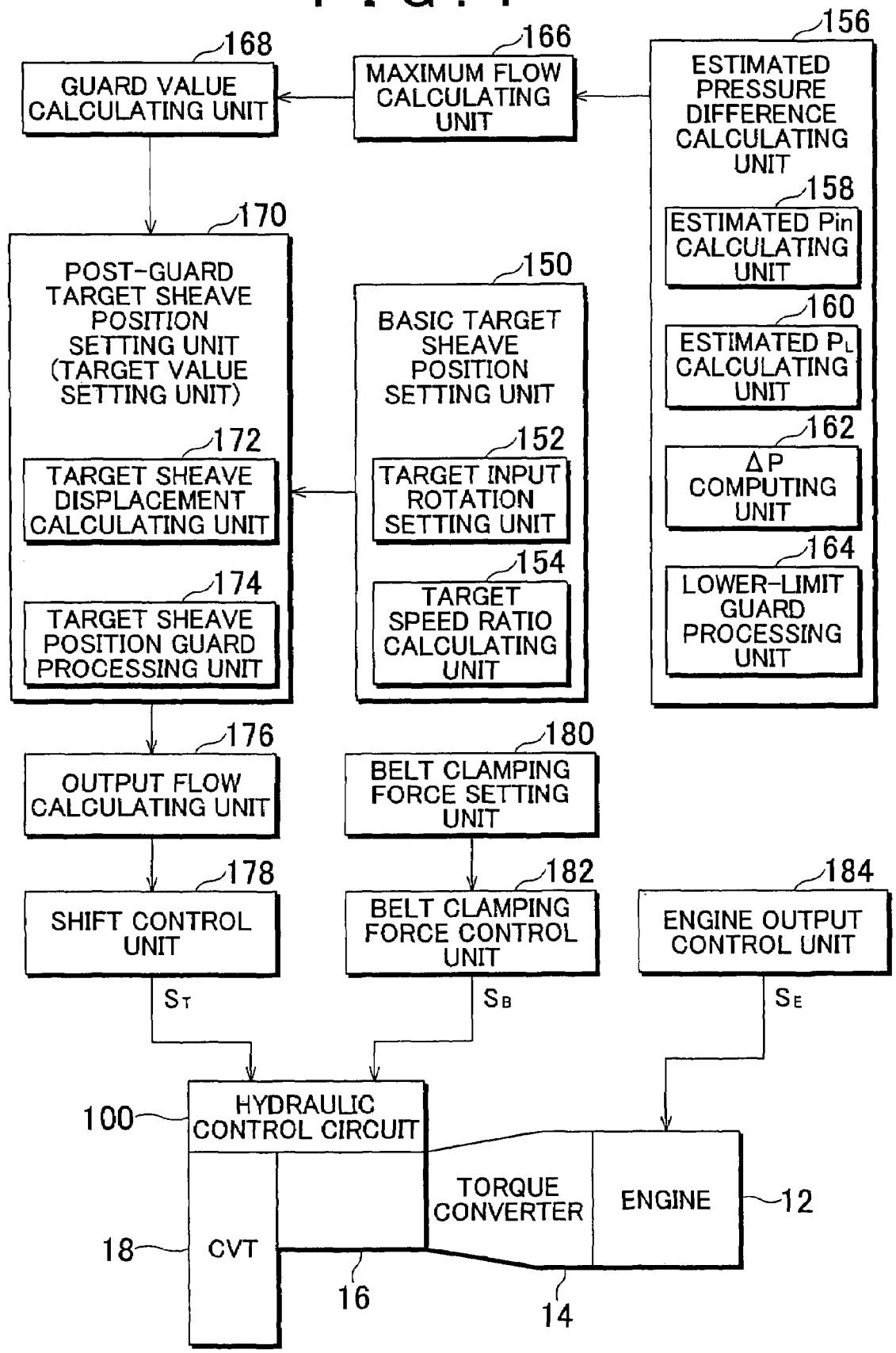
FIG. 4 is a function block diagram useful for explaining principal control functions of an electronic control unit of FIG. 2.

FIG. 4 is a function block diagram useful for explaining a principal part of control functions performed by the electronic control unit 50.

In FIG. 4, a basic target sheave position setting unit 150 sets a basic target sheave position Xt as a target value used for shift control of the continuously variable transmission 18. More specifically, the basic target sheave position setting unit 150 includes a target input rotation setting unit 152 that sets a target input shaft speed $N_{IN}^*$ of the input shaft speed $N_{IN}$, and a target speed ratio calculating unit 154 that coverts the target input shaft speed $N_{IN}^*$ into a target speed ratio γ*. The basic target sheave position setting unit 150 converts the target speed ratio γ* into the sheave position X so as to set the basic target sheave position Xt.

Figure 5:
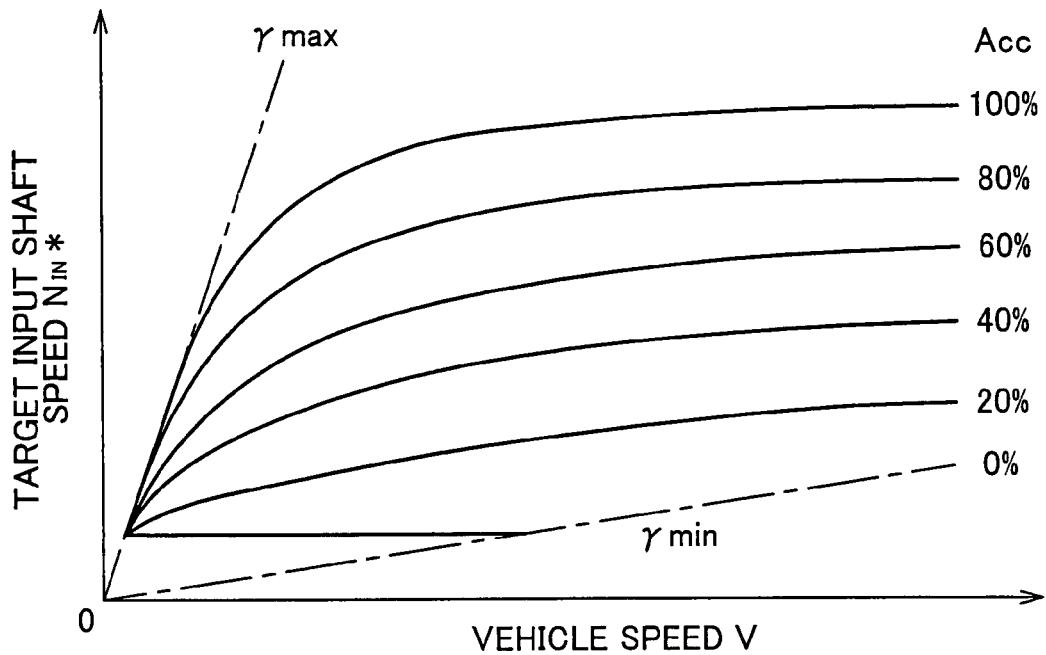
FIG. 5 is a view showing an example of shift map used when determining a target input rotation speed in shift control of the continuously variable transmission.

For example, the target input rotation setting unit 152 sets the target input shaft speed $N_{IN}^*$ of the input shaft speed $N_{IN}$, based on vehicle conditions as represented by the actual vehicle speed V and acceleration stroke Acc, with reference to a predetermined, stored relationship (shift map) between the vehicle speed V and the target input shaft speed $N_{IN}^*$ as a target input rotation speed of the continuously variable transmission 18, using the acceleration stroke Acc as a parameter, as shown in FIG. 5.

The target speed ratio calculating unit 154 calculates the target speed ratio γ* (=$N_{IN}^*/N_{OUT}$), based on the target input shaft speed $N_{IN}^*$ set by the target input rotation setting unit 152.

The basic target sheave position setting unit 150 sets the basic target sheave position Xt, based on the target speed ratio γ* calculated by the target speed ratio calculating unit 154, with reference to a predetermined, stored relationship (sheave position map) (not shown) between the speed ratio γ and the sheave position X that is uniquely determined with respect to the speed ratio γ.

The basic target sheave position Xt is set as a target value used for shift control of the continuously variable transmission 18 basically. In the shift control of the present embodiment, however, feedforward control based on the amount of change of the target value is performed in addition to feedback control based on a difference between the target value and the actual value. Thus, if the target value is set to be increased stepwise in order to improve the shift response, for example, as well known as a manner of setting the target value for use in the feedback control, a command value for the feedforward control may be excessively large and goes beyond an appropriate range in which the command value can be actually generated, depending upon the amount of change of the target value. If changes of the target value are restricted so as not be excessively large, on the other hand, the shift response may become insufficient, depending upon the degree of restriction. If the target value is increased stepwise as described above, a command value is generated under the feedforward control only at a point in time of the increase of the target value, but the output for the feedforward control is made substantially equal to zero in a range or period in which the target value is substantially constant, and shifting may be halted during this period. In this specification, the amount of change represents an amount of change per unit time, and has substantially the same meaning as the rate of change since the term (i.e., the amount of change) is used with regard to a control operation that is repeatedly executed. Similarly, the amount of movement as described later has substantially the same meaning as the rate of movement.

In the present embodiment, a guard process for restricting the amount of change ΔXt of the basic target sheave position Xt (which will be called "amount of change of target sheave position") is performed, and a post-guard target sheave position Xtg is set as a target value. In the following, setting of the post-guard target sheave position Xtg will be explained in detail.

An estimated pressure difference calculating unit 156 calculates an estimated value of a valve pressure difference (which will be called "estimated valve pressure difference") between the line pressure $P_L$ as an upstream pressure of the shift control valves (the speed ratio control valve UP 114 and the speed ratio control valve DN 116), and the shift control pressure Pin as a downstream pressure of the same. More specifically, the estimated pressure difference calculating unit 156 includes an estimated Pin calculating unit 158 that calculates an estimated value of the shift control pressure Pin (which will be called "estimated Pin pressure"), an estimated $P_L$ calculating unit 160 that calculates an estimated value of the maximum line pressure that can be generated at present (which will be called "estimated line pressure"), a ΔP computing unit 162 that computes an estimated valve pressure difference ΔP (=estimated line pressure−estimated Pin pressure), based on the estimated Pin pressure and the estimated line pressure, and a lower-limit guard processing unit 164 that performs a lower-limit guard process for placing the lower limit on the estimated valve pressure difference ΔP thus computed. The estimated pressure difference calculating unit 156 calculates the value obtained as a result of the lower-limit guard process as a final estimated valve pressure difference ΔP. The estimated valve pressure difference ΔP is used when obtaining the amount Q (=the amount of movement ΔX of the input-side movable sheave $42b \times S_{IN}$) of hydraulic fluid that can flow into or out of the input-side hydraulic cylinder 42c at present.

For example, the estimated Pin calculating unit 158 calculates the estimated Pin pressure according to the following equations (5)-(7):

$$\text{Estimated Pin Pressure} = (W_{IN} - k_{IN} \times N_{IN}^2)/S_{IN} \quad (5)$$

$$W_{IN} = W_{OUT}/(a + b \times \log_{10}\gamma + c \times T_{IN} + d \times N_{IN}) \quad (6)$$

$$W_{OUT} = Pd \times S_{OUT} + k_{OUT} \times N_{OUT}^2 \quad (7)$$

In the above-indicated equations, $k_{IN}$ is centrifugal hydraulic pressure coefficient of the input-side hydraulic cylinder 42c, a, b, c, d are empirically obtained coefficients, $T_{IN}$ is input torque applied to the continuously variable transmission 18, Pd is belt clamping pressure detected by the hydraulic pressure sensor 130, $k_{OUT}$ is centrifugal hydraulic pressure coefficient of the output-side hydraulic cylinder 46c.

The above-indicated input torque $T_{IN}$ is calculated from, for example, an estimated value $T_{E0}$ of the engine torque, torque ratio t of the torque converter 14, and the input inertia torque. The engine torque estimated value $T_{E0}$ is calculated based on the actual engine speed $N_E$ and throttle opening $\theta_{TH}$, with reference to an empirically obtained, stored relationship (engine torque map) (not shown) between the engine speed $N_E$ and the engine torque estimated value $T_{E0}$, using the throttle opening $\theta_{TH}$ as a parameter. The torque ratio t is a function of ($N_{IN}/N_E$), and the input inertia torque is calculated from the amount of change of the input shaft speed $N_{IN}$ with time.

The estimated $P_L$ calculating unit 160 calculates the estimated line pressure that can be generated at present, based on the actual engine speed $N_E$, with reference to an empirically obtained, stored relationship (line pressure map) between the rotational speed of the oil pump 28 or the engine speed $N_E$, and the maximum line pressure $P_L$ that can be regulated by the primary regulator valve 122 based on the maximum hydraulic pressure that can be produced by the oil pump 28 in proportion to the engine speed $N_E$.

The $\Delta P$ computing unit 162 calculates the maximum computed value of the estimated valve pressure difference $\Delta P$ based on the estimated line pressure calculated by the estimated $P_L$ calculating unit 160 and the estimated Pin pressure calculated by the estimated Pin calculating unit 158.

The lower-limit guard processing unit 164 determines whether the computed value of the estimated valve pressure difference $\Delta P$ calculated by the $\Delta P$ computing unit 162 is smaller than a pressure difference lower-limit value Pmin as a predetermined lower-limit value. If the computed value of the estimated valve pressure difference $\Delta P$ is equal to or larger than the pressure difference lower-limit value Pmin, the computed value is set as it is as the estimated valve pressure difference $\Delta P$. If the computed value of the estimated value pressure difference. $\Delta P$ is smaller than the pressure difference lower-limit value Pmin, the pressure difference lower-limit value min is set as the estimated valve pressure difference $\Delta P$. The pressure difference lower-limit value is a judgment value that is empirically obtained in advance for use in the lower-limit guard process for placing the lower limit on the computed value of the estimated valve pressure difference $\Delta P$, in order to prevent the computed value form being excessively small because the estimated line pressure and the estimated Pin pressure are both estimated values, and thus prevent the amount Q of hydraulic fluid that can be outputted via the shift control valves from being excessively small.

The estimated pressure difference calculating unit 156 sets the estimated valve pressure difference $\Delta P$ that has been subjected to the lower-limit guard process by the lower-limit guard processing unit 164, as the final estimated valve pressure difference $\Delta P$.

A maximum flow calculating unit 166 calculates the maximum amount Qmax of the hydraulic fluid that can flow into or out of the input-side hydraulic cylinder 42c when a shift control command signal $S_T$ as a drive command value (which will be called "DUTY value") for controlling the duty cycle of the shift control valve is set to a predetermined value, based on the estimated valve pressure difference $\Delta P$ calculated by the estimated pressure difference calculating unit 156. The maximum flow calculating unit 166 uses, as the predetermined value, a reference DUTY value that is a fixed value smaller by a specified degree than the maximum DUTY value. The specified degree is an empirically obtained value that is determined so as to restrict a feedforward flow amount $Q_{FF}$ as the amount of hydraulic fluid that flows under the feedforward control, and ensure a sufficient feedback flow amount $Q_{FB}$ as the amount of hydraulic fluid that flows under the feedback control.

Figure 6:
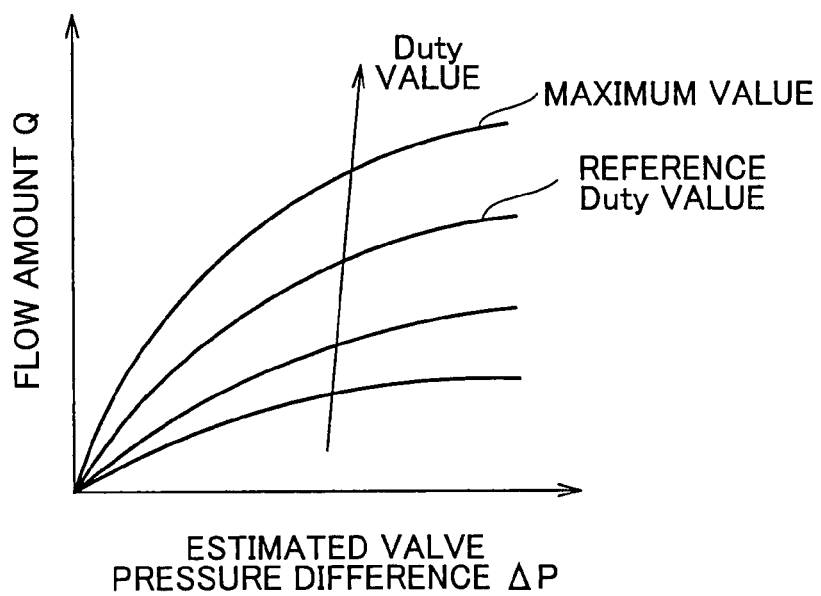
FIG. 6 is a view showing an example of flow amount map used when calculating the maximum amount of hydraulic fluid that can flow into or out of an input-side hydraulic cylinder based on an estimated valve pressure difference.

For example, the maximum flow calculating unit 166 calculates the maximum flow amount Qmax, based on the above-mentioned reference DUTY value and the estimated valve pressure difference $\Delta P$ calculated by the estimated pressure difference calculating unit 156, with reference to a predetermined, stored relationship (flow amount map) between the estimated valve pressure difference $\Delta P$ and the flow amount Q, using the DUTY value as a parameter, as shown in FIG. 6.

A guard value calculating unit 168 calculates a guard value $\Delta Xg$ ($=Qmax/S_{IN}$) of the amount of change $\Delta Xt$ of the target sheave position, based on the maximum flow amount Qmax calculated by the maximum flow calculating unit 166. The guard value $\Delta Xg$ is the maximum amount by which the actual sheave position X can be relatively shifted, namely, the maximum amount by which the input-side movable sheave 42b can be relatively moved. In other words, the guard value $\Delta Xg$ is a sheave displacement guard value for placing the upper limit on the amount of change $\Delta Xt$ of the target sheave position, for use in a guard process (which will be called "sheave displacement guard process") for restricting the amount of change $\Delta Xt$ of the target sheave position as described later.

A post-guard target sheave position setting unit 170 serving as a target value setting unit performs the sheave displacement guard process using the guard value $\Delta Xg$ calculated by the guard value calculating unit 168, so as to set a post-guard target sheave position Xtg. More specifically, the post-guard target sheave position setting unit 170 includes a target sheave displacement calculating unit 172 that calculates the amount of change $\Delta Xt$ of the target sheave position, and a target sheave position guard processing unit 174 that performs the sheave displacement guard process, using the guard value $\Delta Xg$, so as to calculate an amount of change $\Delta Xtg$ of the target sheave position after the guard process (which will be called "post-guard amount of change of the target sheave position"). Thus, the post-guard target sheave position setting unit 170 sets the post-guard target sheave position Xtg based on the post-guard amount of change $\Delta Xtg$ of the target sheave position.

For example, the target sheave displacement calculating unit 172 calculates the amount of change $\Delta Xt$ of the target sheave position according to the following equation (8):

$$\Delta Xt = Xt(i) - Xtg(i-1) \quad (8)$$

In the above equation (8), Xt(i) is the basic target sheave position Xt obtained in the i-th cycle of a control routine (FIG. 9) that is repeatedly executed, and Xtg(i−1) is the post-guard target sheave position Xtg obtained in the (i−1)th cycle of the same routine. In the first cycle of the control routine, the Xtg(i−1) is equal to zero since it is not calculated, and the amount of change ΔXt of the target sheave position is equal to Xt(i).

The target sheave position guard processing unit 174 determines whether an absolute value of the amount of change ΔXt of the target sheave position calculated by the target sheave displacement calculating unit 172 is larger than an absolute value of the guard value ΔXg calculated by the guard value calculating unit 168. If the absolute value of the amount of change ΔXt of the target sheave position is larger than the absolute value of the guard value ΔXg, the guard value ΔXg is set as the post-guard amount of change ΔXtg of the target sheave position. If the absolute value of the amount of change ΔXt of the target sheave position is equal to or smaller than the guard value ΔXg, on the other hand, the amount of change ΔXt of the target sheave position is set as the post-guard amount of change ΔXtg of the target sheave position.

The post-guard target sheave position setting unit 170 calculates the post-guard target sheave position Xtg according to the following equation (9):

$$Xtg = Xtg(i-1) + \Delta Xtg(i) \tag{9}$$

In the above equation (9), ΔXtg(i) is the post-guard amount of change ΔXtg of the target sheave position obtained in the i-th cycle of the control routine (of FIG. 9) that is repeatedly executed. In the first cycle of the control routine, Xtg(i−1) is equal to zero, and the post-guard target sheave position Xtg is equal to ΔXtg(i).

An output flow calculating unit 176 calculates the feedforward flow amount $Q_{FF}$ as a feedforward controlled variable required for implementation of the feedforward control, and the feedback flow amount $Q_{FB}$ as a feedback controlled variable required for implementation of the feedback control. The output flow calculating unit 176 then calculates a shift flow amount $Q_{FFFB}$ (=$Q_{FF}$+$Q_{FB}$) (i.e., an amount of hydraulic fluid flowing into or out of the input-side hydraulic cylinder 42c for shifting the continuously variable transmission 18) as a shift controlled variable required for shifting the continuously variable transmission 18.

For example, the output flow calculating unit 176 calculates the feedfoward flow amount $Q_{FF}$ according to the following equation (10), and calculates the feedback flow amount $Q_{FB}$ according to the following equation (11), so as to calculate the shift flow amount $Q_{FFFB}$.

$$Q_{FF} = (Xtg(i) - Xtg(i-1)) \times S_{IN} \tag{10}$$

$$Q_{FB} = C \times (Xtg(i) - X(i)) + C \times \int d(Xtg(i) - X(i))dt \tag{11}$$

In the above equations (10), (11), Xtg(i) is the post-guard target sheave position Xtg obtained in the i-th cycle of the control routine (of FIG. 9) that is repeatedly executed, and X(i) is the actual sheave position X of the i-th cycle of the same routine, while C is feedback gain. For example, the actual sheave position X is calculated based on the actual speed ratio γ, with reference to the above-mentioned sheave position map.

Figure 7:
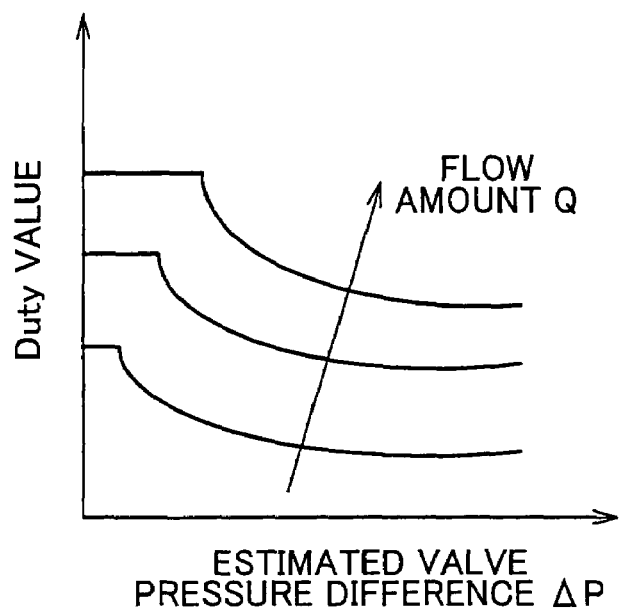
FIG. 7 is a view showing an example of inverted flow amount map used when setting a DUTY value for driving a shift control valve, based on the flow amount for shifting.

A shift control unit 178 outputs a shift control command signal $S_T$ that provides the shift flow amount $Q_{FFFB}$ calculated by the output flow calculating unit 176, to the hydraulic control circuit 100, so as to carry out shifting of the continuously variable transmission 18. For example, the shift control unit 178 sets the DUTY value based on the shift flow amount $Q_{FFFB}$ and the estimated valve pressure difference ΔP calculated by the estimated pressure difference calculating unit 156, with reference to a predetermined, stored relationship (inverted flow amount map) between the estimated valve pressure difference ΔP and the DUTY value as the shift control command signal $S_T$ using the flow amount Q as a parameter, as shown in FIG. 7. The shift control unit 178 then outputs the DUTY value (hydraulic command) to the hydraulic control circuit 100 so as to continuously change the speed ratio γ.

Figure 8:
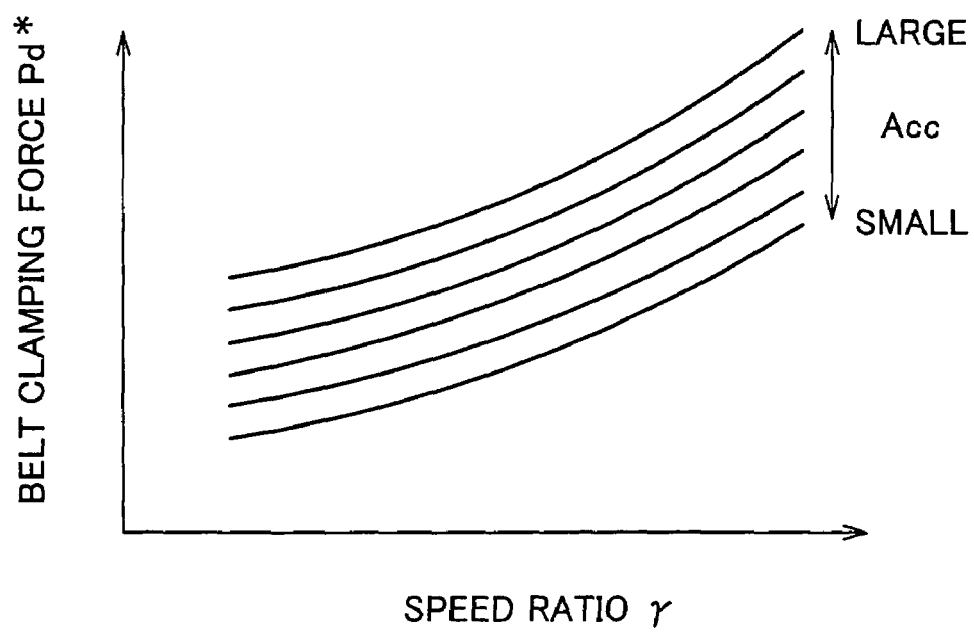
FIG. 8 is a view showing an example of belt clamping force map used for determining belt clamping force in accordance with the speed ratio etc., in clamping force control of the continuously variable transmission.

A belt clamping force setting unit 180 sets a belt clamping force Pd* based on vehicle conditions as represented by the actual speed ratio γ and the acceleration stroke Acc, with reference to a stored relationship (belt clamping force map) between the speed ratio γ and the belt clamping force Pd* using the acceleration stroke Acc corresponding with the transmission torque as a parameter, as shown in, for example, FIG. 8. The belt clamping force map of FIG. 8 was empirically obtained so as not to cause slipping of the transmission belt 48. The belt clamping force setting unit 180 then sets the belt clamping pressure Pd of the output-side hydraulic cylinder 46c, which provides the belt clamping force Pd*.

A belt clamping force control unit 182 outputs a clamping force control command signal $S_B$ to the hydraulic control circuit 100 so as to increase or reduce the belt clamping force Pd*, or the friction between the variable-diameter pulleys 42, 46 and the transmission belt 48. The clamping force control command signal $S_B$ is used for regulating the line pressure $P_L$ to the belt clamping pressure Pd of the output-side hydraulic cylinder 46c so as to provide the belt clamping force Pd* set by the belt clamping force setting unit 180.

The hydraulic control circuit 100 controls the amount of hydraulic oil supplied to or discharged from the input-side hydraulic cylinder 42c by operating the solenoid valve DS1 and the solenoid valve DS2 so as to shift the continuously variable transmission 18 according to the shift control command signal ST. At the same time, the hydraulic control circuit 100 regulates the belt clamping pressure Pd by operating the linear solenoid valve SLS so as to increase or reduce the belt clamping force Pd* according to the clamping force control command signal $S_B$.

An engine output control unit 184 outputs engine output control command signals $S_E$, such as a throttle signal, fuel injection signal and an ignition timing signal, to the throttle actuator 76, fuel injector 78 and the ignition device 80, respectively, so as to control the output power of the engine 12. For example, the engine output control unit 184 outputs a throttle signal for opening and closing the electronic throttle valve 30 to provide a throttle opening $\theta_{TH}$ commensurate with the acceleration stroke Acc, to the throttle actuator 76, so as to control the engine torque $T_E$.

Figure 9:
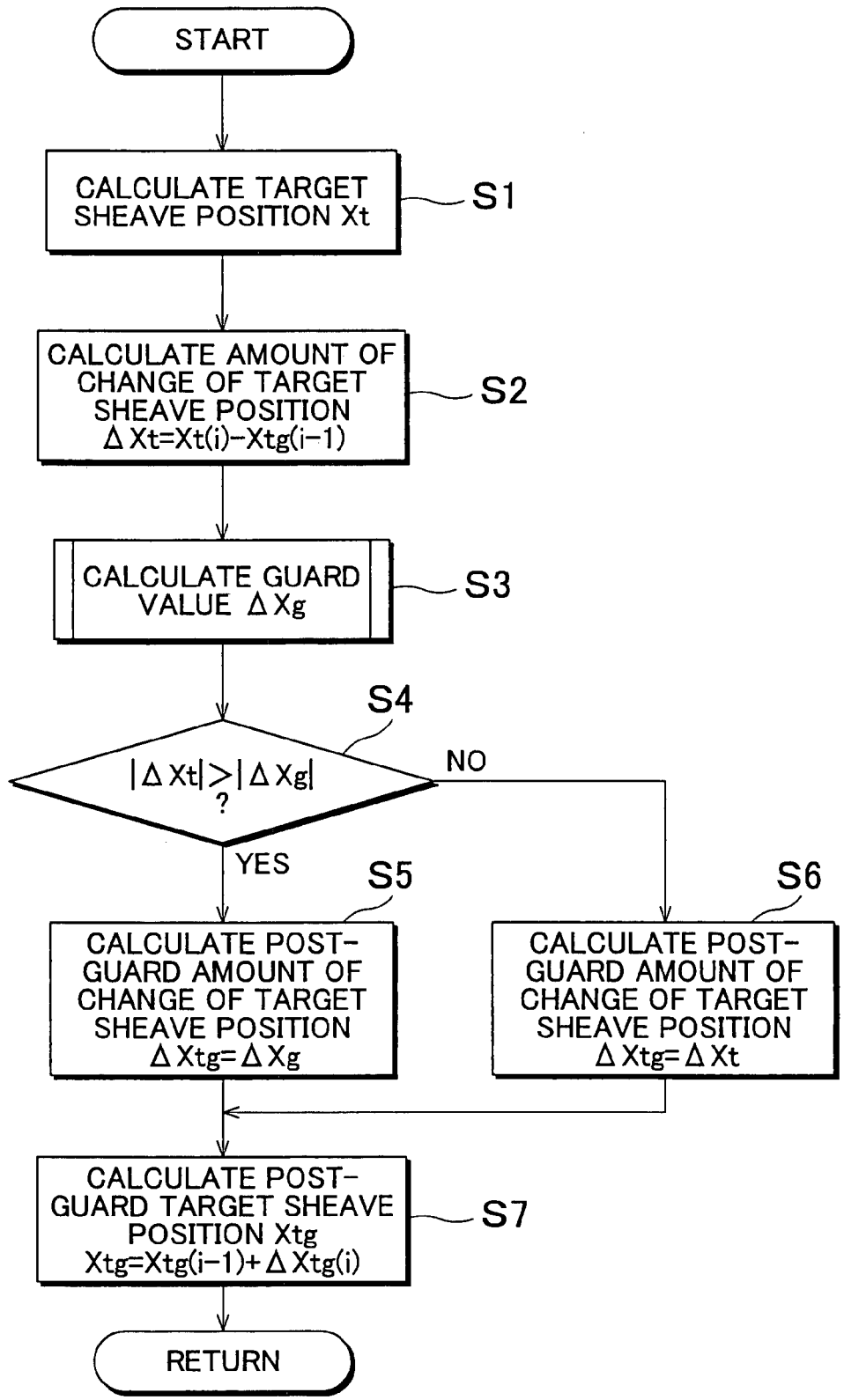
FIG. 9 is a flowchart illustrating a principal part of control operations of the electronic control unit of FIG. 2, more specifically, a control routine for appropriately setting a target sheave position.
Figure 10:
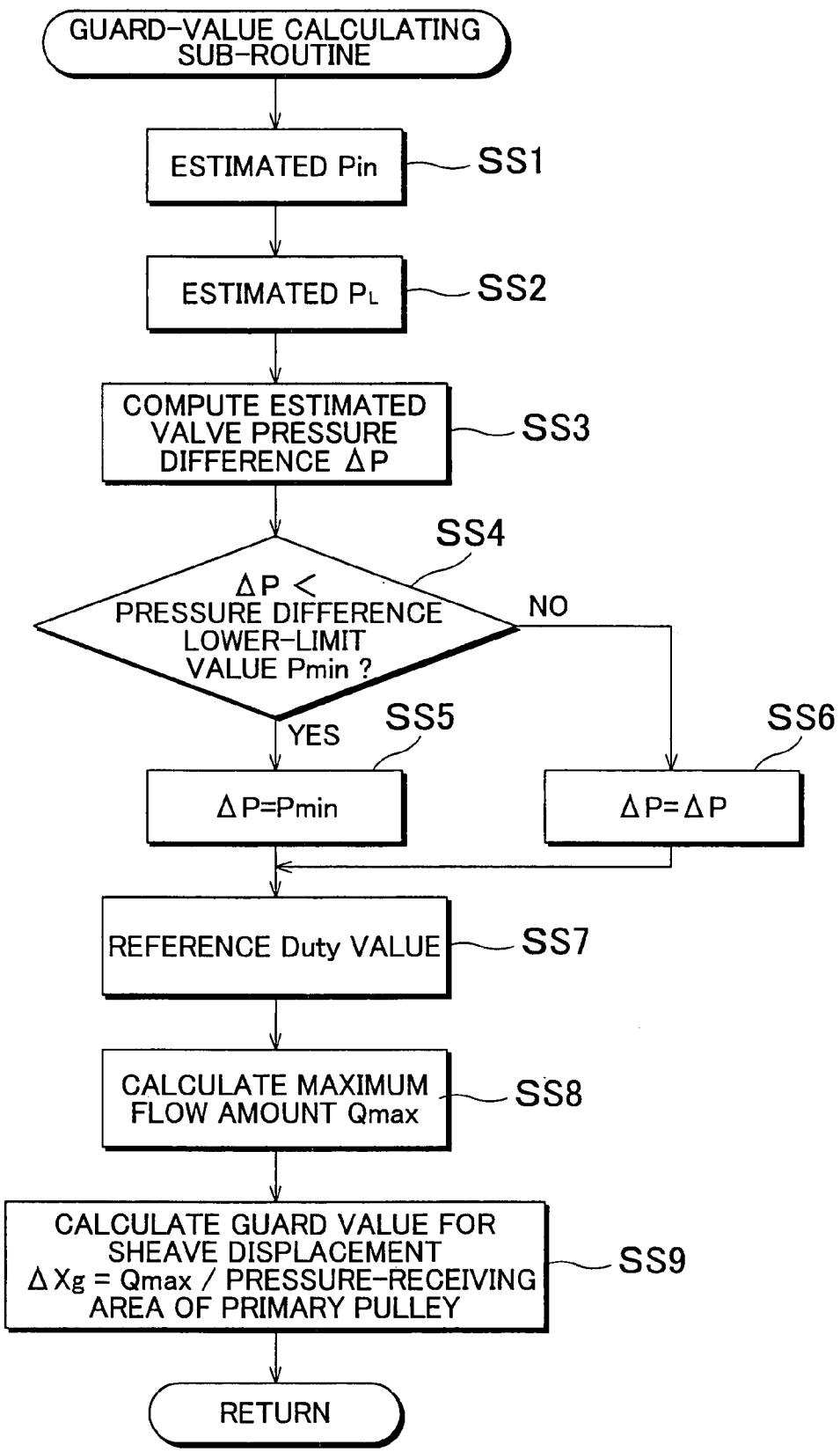
FIG. 10 is a guard-value calculating sub-routine illustrating a control routine for calculating a guard value of the amount of change of the target sheave position, which routine is executed during execution of the control routine of the flowchart shown in FIG. 9.

FIG. 9 is a flowchart explaining a principal part of control operations of the electronic control unit 50, more specifically, a flowchart illustrating a control routine for appropriately setting the target sheave position Xt. The control routine of FIG. 9 is repeatedly executed at extremely short time intervals, for example, at intervals of several milliseconds to several tens of milliseconds. FIG. 10 illustrates a guard value calculating sub-routine explaining a control operation performed during execution of the routine of FIG. 9 for calculating the guard value ΔXg of the amount of change ΔXt of the target sheave position.

In FIG. 9, in step S1 corresponding to the basic target sheave position setting unit 150, the target input shaft speed $N_{IN}$* is set based on the actual vehicle speed V and the acceleration stroke Acc, with reference to the stored shift map as shown in FIG. 5, for example, and the target speed ratio γ* (=$N_{IN}$*/$N_{OUT}$) is calculated based on the target input shaft speed $N_{IN}$*. Then, the basic target sheave position Xt is set based on the target speed ratio γ*, with reference to the predetermined, stored sheave position map defining the relationship between the speed ratio γ and the sheave position X.

Next, in step S2 corresponding to the target sheave displacement calculating unit 172, the amount of change ΔXt of the target sheave position is calculated according to the above-indicated equation that ΔXt=Xt(i)−Xtg(i−1).

Next, in step S3 corresponding to the guard value calculating sub-routine as shown in FIG. 10, the guard value ΔXg of the amount of change ΔXt of the target sheave position is calculated.

More specifically described referring to FIG. 10, in step SS1 corresponding to the estimated Pin calculating unit 158, the estimated Pin pressure is calculated according to the above-indicated equation that estimated Pin pressure=$(W_{IN} - k_{IN} \times N_{IN}^2)/S_{IN}$.

Next, in step SS2 corresponding to the estimated $P_L$ calculating unit 160, the estimated line pressure that can be produced at present is calculated based on the actual engine speed $N_E$, with reference to the stored line pressure map.

Next, in step SS3 corresponding to the ΔP computing unit 162, the computed value of the estimated valve pressure difference ΔP is calculated based on the estimated Pin pressure calculated in step SS1 and the estimated line pressure calculated in step SS2.

Next, in step SS4 corresponding to the lower-limit guard processing unit 164, it is determined whether the computed value of the estimated valve pressure difference ΔP calculated in step SS3 is smaller than the pressure difference lower-limit value Pmin.

If an affirmative decision (YES) is obtained in step SS4, the pressure difference lower-limit value Pmin is set as the estimated valve pressure difference ΔP, and the estimated valve pressure difference ΔP that has been subjected to the lower-limit guard process is obtained as the final estimated valve pressure difference ΔP, in step SS5 corresponding to the lower-limit guard processing unit 164 and the estimated pressure difference calculating unit 156.

If a negative decision (NO) is obtained in step SS4, the computed value of the estimated valve pressure difference ΔP calculated in step SS3 is set as it is as the estimated valve pressure difference ΔP, and the computed value is obtained as the final estimated valve pressure difference ΔP, in step SS6 corresponding to the lower-limit guard processing unit 164 and the estimated pressure difference calculating unit 156.

Subsequent to step SS5 or step SS6, step SS7 corresponding to the maximum flow calculating unit 166 is executed to set the reference DUTY value that is a fixed value as a predetermined value of the shift control command signal $S_T$ used for calculation of the maximum flow amount Qmax in step SS8 as described later.

Next, in step SS8 corresponding to the maximum flow calculating unit 166, the maximum flow amount Qmax is calculated based on the reference DUTY value set in step SS7 and the estimated valve pressure difference ΔP calculated in step SS5 or SS6, with reference to the stored flow amount map as shown in, for example, FIG. 6.

Next, in step SS9 corresponding to the guard value calculating unit 168, the guard value ΔXg (=Qmax/$S_{IN}$) is calculated based on the maximum flow amount Qmax calculated in step SS8.

Referring back to FIG. 9, step S3 is followed by step S4 corresponding to the target sheave position guard processing unit 174, in which it is determined whether the absolute value of the amount of change ΔXt of the target sheave position calculated in step S2 is larger than the absolute value of the guard value ΔXg calculated in step S3.

If an affirmative decision (YES) is obtained in step S4, the guard value ΔXg calculated in step S.3 is set as the post-guard amount of change ΔXtg of the target sheave position in step S5 corresponding to the target sheave position guard processing unit 174.

If a negative decision (NO) is obtained in step S4, the amount of change ΔXt of the target sheave position calculated in step S2 is set as the post-guard amount of change ΔXtg of the target sheave position in step S6 corresponding to the target sheave position guard processing unit 174.

Subsequent to step S5 or step S6, the post-guard target sheave position Xtg is calculated according to the above-indicated equation that Xtg=Xtg(i−1)+ΔXtg(i) in step S7 corresponding to the post-guard target sheave position setting unit 170.

As described above, in the present embodiment, the maximum flow calculating unit 166 calculates the maximum amount Qmax of hydraulic fluid that can flow into or out of the input-side hydraulic cylinder 42c at the time when the shift control command signal $S_T$ is set to the predetermined value, based on the estimated valve pressure difference ΔP calculated by the estimated valve pressure calculating unit 156. Then, the guard value calculating unit 168 calculates the guard value ΔXg based on the maximum flow amount Qmax, and the post-guard target sheave position setting unit 170 performs the guard process for restricting the amount of change of the sheave position, using the guard value ΔXg, so as to set the post-guard target sheave position Xtg. With the guard process thus performed, the post-guard target sheave position Xtg does not undergo excessively large changes nor excessively small changes during shifting of the continuously variable transmission 18; therefore, the target value for shifting is set so that the feedforward controlled variable based on the post-guard amount of change ΔXtg of the target sheave position becomes an appropriate value.

Also, in the present embodiment, the maximum flow calculating unit 166 uses, as the predetermined value, the reference DUTY value that is a fixed value smaller by a specified degree than the maximum value of the DUTY value as the shift control command signal $S_T$. It is thus possible to restrict the feedfoward flow amount $Q_{FF}$ required for the feedforward control, while assuring a sufficient feedback flow amount $Q_{FB}$ for the feedback control so as to maintain sufficiently high control response associated with the feedback control.

Also, in the present embodiment, the estimated pressure difference calculating unit 156 sets the computed value of the estimated valve pressure difference ΔP as it is as the estimated valve pressure difference ΔP if the computed value is equal to or smaller than the pressure difference lower-limit value Pmin, and sets the pressure difference lower-limit value Pmin as the estimated valve pressure difference ΔP if the computed value of the estimated valve pressure difference ΔP is smaller than the lower-limit value Pmin. Thus, even if the computed value of the estimated valve pressure difference ΔP is erroneously estimated to be an extremely small value, which is smaller than the pressure difference lower-limit value Pmin, the maximum flow amount Qmax calculated based on the estimated valve pressure difference ΔP is prevented from being excessively small. Consequently, the guard value ΔXg is prevented from being excessively small, and the post-guard target sheave position Xtg does not undergo excessively small changes.

Also, in the present embodiment, since the estimated value of the maximum line pressure that can be produced at present (estimated line pressure) is used for calculation of the estimated valve pressure difference ΔP, the maximum amount Qmax of hydraulic fluid that can flow into or out of the input-side hydraulic cylinder 42c can be appropriately calculated, and the flow amount Q can be stably outputted.

Also, in the present embodiment, the continuously variable transmission 18 is a belt-and-pulley type continuously variable transmission, in which the input-side hydraulic cylinder 42c and the output-side hydraulic cylinder 46c drive the input-side movable sheave 42b and the output-side movable sheave 46b, respectively. Since the target value (post-guard target sheave position Xtg) is set with respect to the sheave position X of the input-side movable sheave 42b in the manner as described above, the continuously variable transmission 18 can be appropriately shifted up or down.

While one embodiment of the invention has been described in detail with reference to the drawings, the invention may be embodied in various other forms.

While the invention is applied to the continuously variable transmission of the belt-and-pulley type in the illustrated embodiment, the invention may also be applied to a toroidal-type continuously variable transmission. The toroidal-type continuously variable transmission includes a pair of coned members that are rotated about a common axis, and a plurality of rollers that are sandwiched between the pair of coned members and are rotatable about the axis of rotation that intersects with the common axis. By changing the angle of intersection between the axis of rotation of the rollers and the axis of the coned members, the speed ratio of the transmission is continuously changed.

While the target sheave position Xt is set as the target value for use in shift control of the continuously variable transmission 18 in the illustrated embodiment, the target speed ratio $\gamma^*$ or the target input shaft speed $N_{IN}^*$ determined in view of the output shaft speed $N_{OUT}$ (vehicle speed V), which has a one-to-one relationship with the target sheave position Xt, may be set as the target value.

While the feedback control and feedforward control are performed using the target sheave position Xt as the target value in the illustrated embodiment, the feedback control and the feedforward control do not necessarily use the same target value, but may use separately set target values that are related to each other. For example, the feedfoward control may be performed based on the amount of change $\Delta Xt$ of the target sheave position, using the target sheave position Xt as the target value, and the feedback control may be performed based on a difference between the target input shaft speed $N_{IN}^*$ and the actual input shaft speed $N_{IN}$, using the target input shaft speed $N_{IN}^*$ having a one-to-one relationship with the target sheave position Xt, as a target value.

While the belt clamping pressure Pd detected by the hydraulic pressure sensor 130 is used as the belt clamping pressure Pd for use in calculation of the estimated Pin pressure by the estimated Pin calculating unit 158 in the illustrated embodiment, the belt clamping pressure Pd set by the belt clamping force setting unit 180 may be used. In the case where the belt clamping pressure Pd detected by the hydraulic pressure sensor 130 is not used as the belt clamping pressure Pd, the hydraulic pressure sensor 130 may not necessarily be provided.

While the maximum flow calculating unit 166 uses the reference DUTY value that is a fixed value as a predetermined value when calculating the maximum flow amount Qmax in the illustrated embodiment, the DUTY value used for the calculation may not necessarily be a fixed value. For example, when a difference (=Xtg−X) between the post-guard target sheave position Xtg and the actual sheave position X is large, as in the initial period of shifting, the DUTY value may be set to a relatively small value so as to ensure an increased feedback flow amount $Q_{FB}$. As the shifting operation proceeds, and the above-mentioned difference decreases, the DUTY value may be set to increase toward the maximum value.

The input shaft speed $N_{IN}$ or target input shaft speed $N_{IN}^*$ related to $N_{IN}$ used in the illustrated embodiment may be replaced by the engine speed $N_E$ or target engine speed $N_E^*$ related to $N_E$, or the turbine speed $N_T$ or target turbine speed $N_T^*$ related to $N_T$.

While the torque converter 14 equipped with the lock-up clutch 26 is used as a hydraulic power transmitting device in the illustrated embodiment, the lock-up clutch 26 may not necessarily be provided. Also, the torque converter 14 may be replaced with other hydraulic power transmitting devices, such as a fluid coupling having no torque amplifying function.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the scope of the invention.

What is claimed is:

1. A shift control system for a continuously variable transmission of a vehicle having a hydraulic actuator that is driven with a hydraulic fluid supplied thereto or discharged therefrom so as to continuously change a speed ratio of the transmission, wherein a drive command value for use in drive control of a shift control valve that adjusts an amount of the hydraulic fluid flowing into or out of the hydraulic actuator is obtained based on a feedforward controlled variable that is determined based on an amount of change of a target value for use in shift control of the continuously variable transmission, comprising:

an estimated pressure difference calculating unit that calculates an estimated value of a pressure difference between an upstream hydraulic pressure and a downstream hydraulic pressure of the shift control valve;

a maximum flow calculating unit that calculates a maximum flow amount as the maximum amount of the hydraulic fluid that can flow into or out of the hydraulic actuator when the drive command value is set to a predetermined value, based on the estimated value of the pressure difference;

a guard value calculating unit that calculates a guard value of the amount of change of the target value, based on the maximum flow amount; and a target value setting unit that performs a guard process for restricting the amount of change of the target value, using the guard value, so as to set the target value.

2. A shift control system for a continuously variable transmission according to claim 1, wherein the maximum flow calculating unit uses a value that is smaller by a specified degree than the maximum value of the drive command value, as the predetermined value.

3. A shift control system for a continuously variable transmission according to claim 1, wherein the estimated pressure difference calculating unit sets a computed value of the pressure difference determined based on the upstream hydraulic pressure and downstream hydraulic pressure of the shift control valve, as the estimated value of the pressure difference, when the computed value is equal to or larger than a predetermined lower-limit value, and sets the lower-limit value as the estimated value of the pressure difference when the computed value is smaller than the predetermined lower-limit value.

4. A shift control system for a continuously variable transmission according to claim 1, wherein:
the upstream hydraulic pressure of the shift control valve is a line pressure;
the downstream hydraulic pressure of the shift control valve is a hydraulic pressure applied to the hydraulic actuator; and
the estimated pressure difference calculating unit calculates an estimated value of a maximum pressure difference between the line pressure and the hydraulic pressure applied to the hydraulic actuator, based on the maximum line pressure that can be produced.

5. A shift control system for a continuously variable transmission according to claim 1, wherein:
the continuously variable transmission comprises a belt-and-pulley continuously variable transmission having a primary pulley and a secondary pulley each having a variable effective diameter and including a fixed sheave and a movable sheave, and a belt that engages the primary and secondary pulleys;
the hydraulic actuator is operable to drive the movable sheave of the primary pulley; and
a position of the movable sheave is set as the target value.

6. A shift control system for a continuously variable transmission according to claim 1, wherein:
the continuously variable transmission comprises a toroidal continuously variable transmission having a pair of coned members that are rotated about a common axis, and a plurality of rollers that are sandwiched between said pair of coned members and are rotatable about an axis of rotation that intersects with the common axis; and
an angle of intersection between the axis of rotation of the rollers and the axis of rotation of the coned members is changed so as to continuously change the speed ratio of the continuously variable transmission.

7. A shift control system for a continuously variable transmission according to according to claim 1, wherein the maximum flow calculating unit uses a value that can be varied as shifting of the transmission proceeds, as the predetermined value.

8. A shift control method for a continuously variable transmission of a vehicle having a hydraulic actuator that is driven with a hydraulic fluid supplied thereto or discharged therefrom so as to continuously change a speed ratio of the transmission, wherein a drive command value for use in drive control of a shift control valve that adjusts an amount of the hydraulic fluid flowing into or out of the hydraulic actuator is obtained based on a feedforward controlled variable that is determined based on an amount of change of a target value for use in shift control of the continuously variable transmission, comprising:
calculating an estimated value of a pressure difference between an upstream hydraulic pressure and a downstream hydraulic pressure of the shift control valve;
calculating a maximum flow amount as the maximum amount of the hydraulic fluid that can flow into or out of the hydraulic actuator when the drive command value is set to a predetermined value, based on the estimated value of the pressure difference;
calculating a guard value of the amount of change of the target value, based on the maximum flow amount; and
performing a guard process for restricting the amount of change of the target value, using the guard value, so as to set the target value.

9. A shift control method for a continuously variable transmission according to claim 8, wherein a value that is smaller by a specified degree than the maximum value of the drive command value is used as the predetermined value.

10. A shift control method for a continuously variable transmission according to claim 8, wherein a computed value of the pressure difference determined based on the upstream hydraulic pressure and downstream hydraulic pressure of the shift control valve is set as the estimated value of the pressure difference when the computed value is equal to or larger than a predetermined lower-limit value, and the lower-limit value is set as the estimated value of the pressure difference when the computed value is smaller than the predetermined lower-limit value.

11. A shift control method for a continuously variable transmission according to claim 8, wherein:
the upstream hydraulic pressure of the shift control valve is a line pressure;
the downstream hydraulic pressure of the shift control valve is a hydraulic pressure applied to the hydraulic actuator; and
an estimated value of the maximum pressure difference between the line pressure and the hydraulic pressure applied to the hydraulic actuator is calculated based on a maximum line pressure that can be produced.

* * * * *